United States Patent
Zhang et al.

(10) Patent No.: US 11,238,618 B2
(45) Date of Patent: Feb. 1, 2022

(54) IMAGE RECOGNITION

(71) Applicant: International Business Machines Corporation, Armonk, NY (US)

(72) Inventors: Jie Zhang, Beijing (CN); Qing Wang, Beijing (CN); Shi Lei Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/695,463

(22) Filed: Nov. 26, 2019

(65) Prior Publication Data

US 2021/0158571 A1    May 27, 2021

(51) Int. Cl.
*G06T 7/00* (2017.01)
*G06K 9/46* (2006.01)
(Continued)

(52) U.S. Cl.
CPC ............... *G06T 7/90* (2017.01); *G06K 9/38* (2013.01); *G06K 9/4652* (2013.01); *G06T 7/11* (2017.01);
(Continued)

(58) Field of Classification Search
CPC ... G06T 7/90; G06T 7/11; G06T 7/194; G06T 2207/10024; G06T 2207/10016; G06K 9/38; G06K 9/4652
See application file for complete search history.

(56) References Cited

U.S. PATENT DOCUMENTS

| | | | |
|---|---|---|---|
| 4,251,799 A | 2/1981 | Jih | |
| 8,818,099 B2 * | 8/2014 | Tian | G06K 9/38 |
| | | | 382/176 |

(Continued)

FOREIGN PATENT DOCUMENTS

| | | |
|---|---|---|
| CN | 109145907 A | 1/2019 |
| WO | 2016065701 A1 | 5/2016 |
| WO | 2016071903 A2 | 6/2016 |

OTHER PUBLICATIONS

Kannao et al., "Overlay Text Extraction From TV News Broadcast", arXiv:1604.00470v1 [cs.CV] Apr. 2, 2016, 6 pps.
(Continued)

*Primary Examiner* — Vu Le
*Assistant Examiner* — Winta Gebreslassie
(74) *Attorney, Agent, or Firm* — Alexander G. Jochym

(57) ABSTRACT

Aspects of the present invention disclose a method, computer program product, and system for image processing. The method includes one or more processors generating a first set of binary images from a first image based on a first color attribute value range associated with a textual object presented in the first image. The method further includes one or more processors recognizing a first set of candidates for the textual object from the first set of binary images. The method further includes one or more processors determining a first appearance frequency of a first candidate in the first set of candidates. In response to determining that the first appearance frequency exceeds a first frequency, threshold he method further includes one or more processors determining that the first candidate is a first recognition result for the textual object in the first image.

18 Claims, 11 Drawing Sheets

(51) Int. Cl.
  *G06T 7/11*  (2017.01)
  *G06T 7/194* (2017.01)
  *G06T 7/90*  (2017.01)
  *G06K 9/38*  (2006.01)

(52) U.S. Cl.
  CPC .... *G06T 7/194* (2017.01); *G06T 2207/10016* (2013.01); *G06T 2207/10024* (2013.01)

(56) References Cited

U.S. PATENT DOCUMENTS

| | | | |
|---|---|---|---|
| 9,183,452 | B2 | 11/2015 | Bissacco |
| 9,235,757 | B1 | 1/2016 | Liu |
| 2013/0188863 | A1 | 7/2013 | Linderman |
| 2013/0257892 | A1* | 10/2013 | Ozawa .............. G06K 9/38 345/589 |
| 2015/0256713 | A1* | 9/2015 | Booth ............... G06K 9/38 358/466 |
| 2017/0109576 | A1* | 4/2017 | Shustorovich ....... G06T 7/187 |
| 2020/0175137 | A1* | 6/2020 | Wei ................ G06F 21/10 |

OTHER PUBLICATIONS

Kasar et al., "Font and Background Color Independent Text Binarization", Medical Intelligence and Language Engineering Laboratory Department of Electrical Engineering, Indian Institute of Science Bangalore, India—560 012, printed from the Internet on Mar. 20, 2019, 7 pps.

Kuguoglu, "How to Use Image Preprocessing to Improve the Accuracy of Tesseract", freeCodeCamp, Jun. 6, 2018, 9 pps., <https://medium.freecodecamp.org/getting-started-with-tesseract-part-ii-f7f9a0899b3f>.

Milyaev et al., "Fast and Accurate Scene Text Understanding With Image Binarization and Off-The-Shelf OCR", Springer, International Journal on Document Analysis and Recognition, Jun. 2015, vol. 18, Issue 2, pp. 169-182, <https://link.springer.com/article/10.1007/s10032-015-0240-4>.

Santhanaprabhu et al., "Text Extraction and Document Image Binarization Using Sobel Edge Detection", Int. Journal of Engineering Research and Applications ISSN : 2248-9622, vol. 4, Issue 5( Version 4), May 2014, pp. 15-21, Research Article, <https://pdfs.semanticscholar.org/5ed5/d0d55273fa04cb9a59fc2344b2d104009429.pdf>.

Wolf et al., "Text Localization, Enhancement and Binarization in Multimedia Documents", 4 pps., printed from the Internet on Mar. 20, 2019.

Mell et al., "The NIST Definition of Cloud Computing", National Institute of Standards and Technology, U.S. Department of Commerce, NIST Special Publication 800-145, Sep. 2011, 7 pages.

* cited by examiner

IMAGE RECOGNITION

BACKGROUND OF THE INVENTION

The present invention relates to image processing, and more specifically image recognition.

Image analysis is the extraction of meaningful information from images; mainly from digital images by means of digital image processing techniques. Analyzing images utilizes a plurality of techniques, such as 2D and 3D object recognition, image segmentation, motion detection, video tracking, optical flow, number recognition, etc. In computer science, digital image processing is the use of computer algorithms to perform image processing on digital images. In addition, object recognition, with respect to computer vision technology, applies to finding and identifying objects in an image or video sequence. Object-Based Image Analysis (OBIA) employs two main processes, segmentation and classification. Traditional image segmentation is on a per-pixel basis. However, OBIA groups pixels into homogeneous objects. These objects can have different shapes and scale. Objects also have statistics associated with them which can be used to classify objects. Statistics can include geometry, context and texture of image objects. The analyst defines statistics in the classification process to generate for example land cover. Nowadays, the need for recognizing text from images, such as frames of a video is increasingly growing. The capability of the existing approaches, such as Tesseract, in recognizing the textual object in the video is limited.

SUMMARY

Aspects of the present invention disclose a method, computer program product, and system for image processing. The method includes one or more processors generating a first set of binary images from a first image based on a first color attribute value range associated with a textual object presented in the first image. The method further includes one or more processors recognizing a first set of candidates for the textual object from the first set of binary images. The method further includes one or more processors determining a first appearance frequency of a first candidate in the first set of candidates. In response to determining that the first appearance frequency exceeds a first frequency, threshold he method further includes one or more processors determining that the first candidate is a first recognition result for the textual object in the first image.

BRIEF DESCRIPTION OF THE DRAWINGS

Through the more detailed description of some embodiments of the present disclosure in the accompanying drawings, the above and other textual objects, features and advantages of the present disclosure will become more apparent, wherein the same reference generally refers to the same components in the embodiments of the present disclosure.

DETAILED DESCRIPTION

Figure 1:
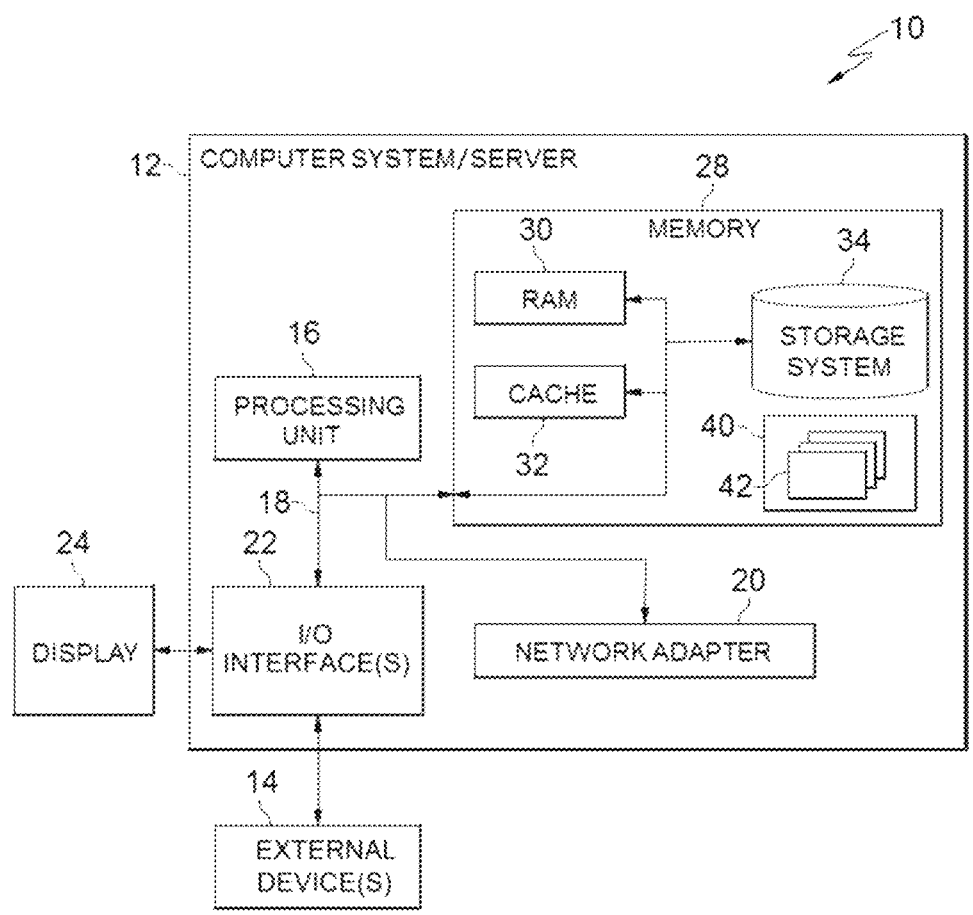
FIG. 1 depicts a cloud computing node, in accordance with an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
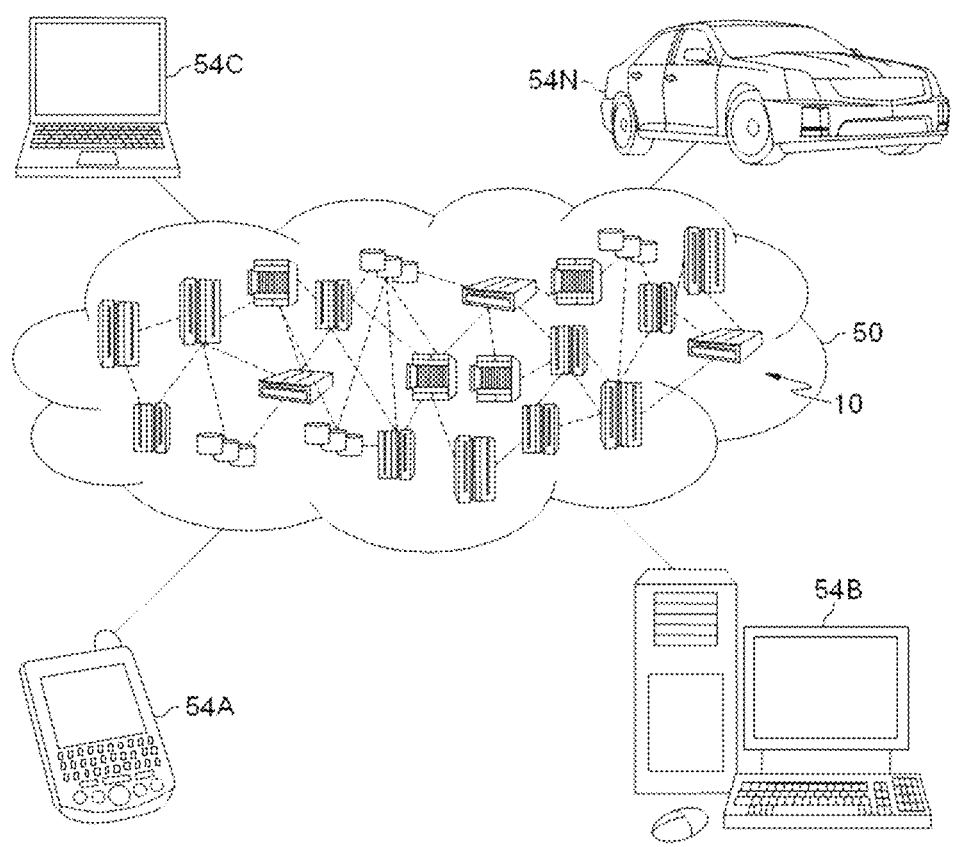
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
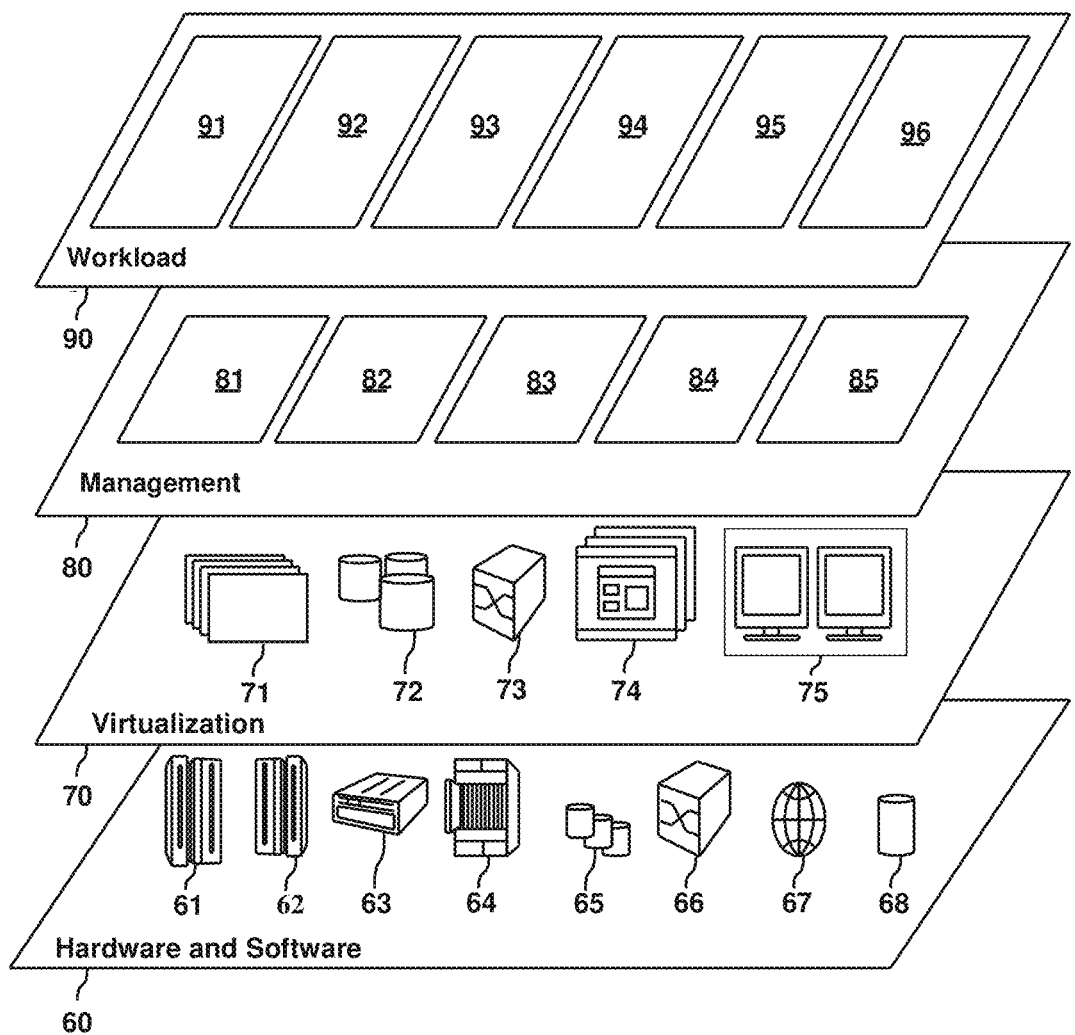
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

As discussed above, the need for recognizing texts from images, such as frames of a video, is increasingly growing. Embodiments of the present invention recognize that due to the incapability of the existing approaches, a number of image processing operations have to be tried repeatedly, so as to achieve an acceptable recognition result. As a result, the existing approaches suffer from low accuracy, low time efficiency and high cost.

Figure 4:
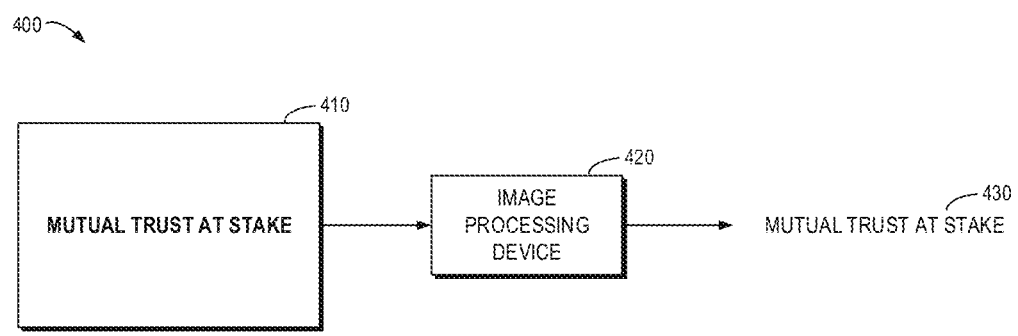
FIG. 4 depicts a schematic diagram of a general image processing environment, in accordance with an embodiment of the present invention.

FIG. 4 illustrates image processing environment 400, a general environment for recognizing texts from an image, in accordance with embodiments of the present invention. As shown in FIG. 4, an input image 410 is input to an image processing device 420. For example, the input image 410 can be a general image, or an image captured from a video. In the example of FIG. 4, the input image 410 is an illustrative image including a sequence of textual objects "mutual trust at stake." The image processing device 420 may be configured to perform image recognition on the image 410 and provides a recognition result 430 for a textual object in the image 410. The image processing device 420 may be implemented by the computer system/server 12, or other suitable computer/computing systems, in accordance with various embodiments of the present invention.

More specifically, as the image 410 is input into the image processing device 420 for recognizing, image processing device 420 recognizes a sequence of recognition results 430 "mutual trust at stake" from the image 410. In some embodiments, during the process of recognition, the image processing device 420 may perform a layout analysis on the image 410, to determine the layout or location of the sequence of text objects in the image 410. For example, image processing device 420 can determine the vertical and horizontal boundaries of the sequence of text objects in the image 410. Then, the image processing device 420 may correct the direction of the sequence of text objects. As an example, when a document is inappropriately placed on a scanner, the textual objects in the scanning image may be tilted, and such tilted text can be corrected to be a non-tilted text.

Then, the image processing device 420 may detect one or more individual textual objects in the sequence of textual objects, so as to locate these textual objects separately. In this case, the image processing device 420 may recognize the textual objects from the image 410. For example, image processing device 420 can recognize the sequence of textual objects "mutual trust at stake" as "mutual trust at stake". The image processing device 420 may correct the semantic error in the recognition result. For instance, image processing device 420 can correct the incorrect recognition result "mutual trust at stake" to be "mutual trust at stake." Finally, the image processing device 420 may output the recognition result "mutual trust at stake."

Various image recognition approaches have been proposed. However, the conventional approaches have their disadvantages. For example, the binary image and the recognition results obtained from the conventional approaches are often unsatisfactory. To deal with this, the parameters used for recognition are required to be manually tuned. Such manual tuning is inaccurate, time consuming and costly.

Example embodiments of the present disclosure propose an improved solution for image processing. Generally speaking, according to embodiments of the present disclosure, the proposed solution generates a set of binary images from an image to be recognized based on a color attribute value range associated with a textual object presented in the image, so as to achieve accurate and fast image binarization more suitable for the textual object.

Further, embodiments of the present invention can recognize a set of candidates for the textual object from the set of binary images and determine an appearance frequency of a candidate in the set of. Then, embodiments of the present invention determine the as a recognition result for the textual object in the image in response to the appearance frequency exceeding a frequency threshold. As such, the recognition of the textual object from the image can be accurate, time efficient and cost saving.

Figure 5:
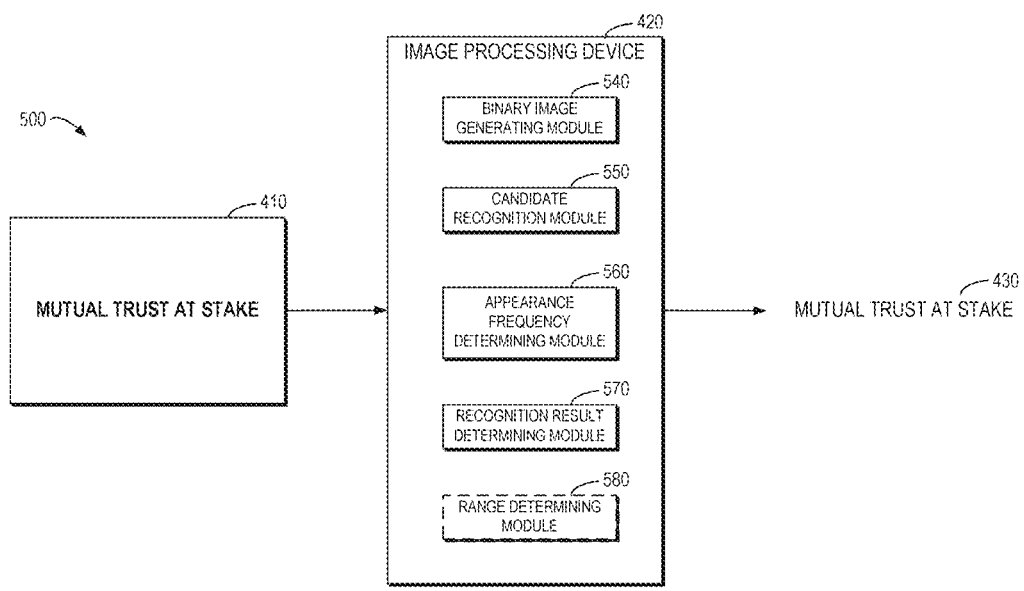
FIG. 5 depicts a schematic diagram of an image processing environment, in accordance with an embodiment of the present invention.

Now some example embodiments will be described with reference to FIGS. 5-11. FIG. 5 depicts a schematic diagram of an image processing environment 500 according to an embodiment of the present invention. Similar to the environment 400, the environment 500 involves an input image 410, an image processing device 420 and a recognition result 430 for the textual object in the image 410.

According to example embodiments of the present disclosure, the image processing device 420 includes a binary image generating module 540, a candidate recognition module 550, an appearance frequency determining module 560, and a recognition result determining module 570.

The binary image generating module 540 generates a set of binary images (referred to as "a first set of binary images") from the image 410 based on a color attribute value range (referred to as "first color attribute value range"). Hereinafter, the image 410 is also referred to as a first image. The determination of the first color attribute value range can be implemented in a variety of ways and will be described in further detail below with reference to FIG. 7.

In some embodiments, the binary image generating module 540 may select a set of color attribute values from the first color attribute value range and generate the first set of binary images by binarizing the image 410 based on the set of color attribute values. For example, the set of color attribute values can be selected from the first color attribute value range with a predetermined interval. As such, the first set of binary images can be obtained by binarizing the image 410 at the color attribute values.

Figure 6:
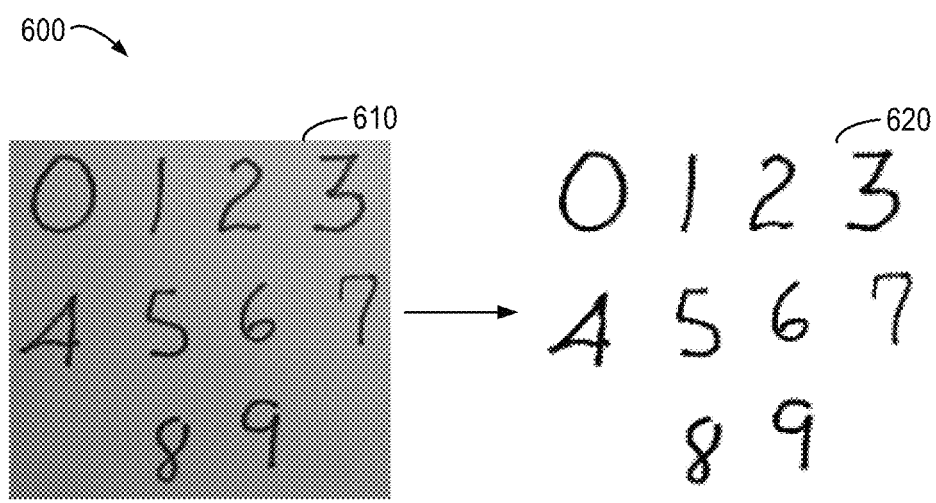
FIG. 6 depicts a schematic diagram of an example original image and an example binary image generated from the original image, in accordance with an embodiment of the present invention.

To better understand the image binarization, FIG. 6 depicts a schematic diagram 600 of an example original image 610 and an example binary image 620, generated from the original image 610, according to an embodiment of the present invention. For illustration purposes, only one binary image 620 is shown, however, a set of binary images can be generated from of original image 610. In addition, it is to be understood that, the binary image 620 is still an image, and is not yet recognized as text. Accordingly, the image binarization can be optimized by locating the textual object and binarizing the image based on the color attribute associate with the textual object.

Returning back to FIG. 5, the candidate recognition module 550 recognizes a set of candidates (referred to as "a first set of candidates") for the textual object from the first set of binary images. For example, for the textual object "mutual" in the image 410, the first set of candidates may include "mutual," "manual," and so on. Embodiments of the present invention recognize that, some of the first candidates may not be consistent with the real textual object (i.e., may be incorrect).

The appearance frequency determining module 560 determines an appearance frequency (referred to as "first appearance frequency") of a first candidate in the first set of candidates. The appearance frequency can indicate the number of instances, the probability, or the likelihood that a specific candidate is obtained. For example, for the textual object "mutual," 10 binary images can be included in the first set of binary images. In some embodiments, for each binary image of the first set of binary images, a candidate can be recognized. As a result, 10 candidates for the 10 binary images are included in the first set of candidates.

A candidate in the first set of candidates may match to another candidate in the first set of candidates. As an example, the candidate "mutual" may appear 8 times in the first set of candidates, and the candidate "manual" may appear 2 times in the first set of candidates. Accordingly, when the appearance frequency indicates the number of instances of appearance, appearance frequency determining module 560 can determine the appearance frequency for the candidate "mutual" as 8 and determine the appearance frequency for the candidate "mutual" as 2. Alternatively, when the appearance frequency indicates the probability of appearance, appearance frequency determining module 560 can determine the appearance frequency for the candidate "mutual" as 80% (i.e. 8/10) and determine the appearance frequency for the candidate "mutual" as 20% (i.e. 2/10).

Then, the recognition result determining module 570 compares the first appearance frequency with a frequency threshold (referred to as "first frequency threshold"). If recognition result determining module 570 determines that the first appearance frequency exceeds the first frequency threshold, then the recognition result determining module 570 may determine the first candidate as a recognition result (referred to as "first recognition result") for the textual object in the image 410.

In some embodiments, recognition result determining module 570 can determine the recognition result to be the first candidate that appears most frequently with the maximum appearance frequency. For example, since the first candidate "mutual" appears 8 times and has the maximum appearance frequency, recognition result determining module 570 that the first candidate "mutual" is the recognition result.

The recognition results for the other textual objects in the sequence of textual objects (e.g., the textual objects "trust," "at," and "stake" in the image 410) can be similarly determined. As such, embodiments of the present invention operate to recognize the textual objects in the image as text in an accurate, time efficient and cost saving manner.

Figure 7:
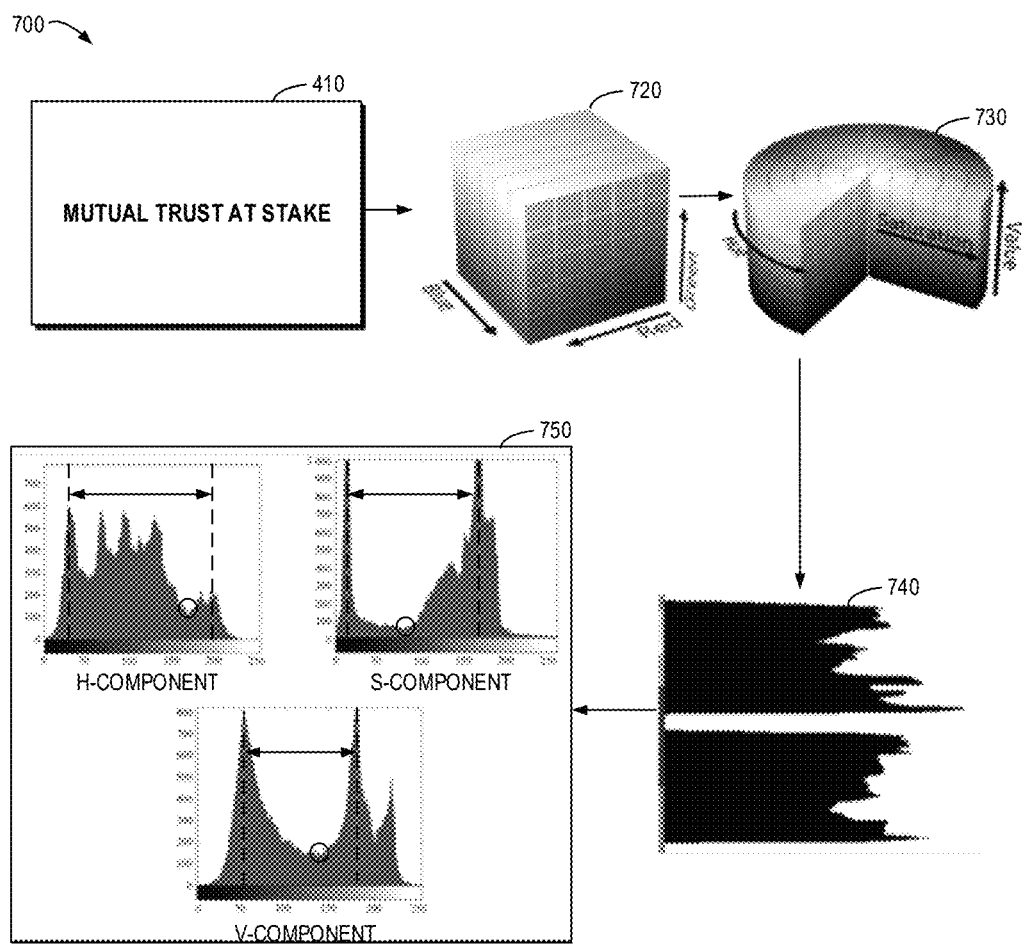
FIG. 7 depicts a schematic diagram of an example color attribute value range determination process, in accordance with an embodiment of the present invention.

In some example embodiments, the image processing device 420 may further include a range determining module 580 to determine the first color attribute value range associated with the textual object presented in the image 410. Range determining module 580 can determine the first color attribute value range to generate the first set of binary images. FIG. 7 depicts a schematic diagram of an example color attribute color determination process 700, according to an embodiment of the present invention.

As shown in FIG. 7, the image 410 may be of an original color space 720. The range determining module 580 may convert the color space 720 of the image 410 to another color space 730 facilitating locating the textual object in the image 410. For example, the original color space may be the RGB (Red, Green, Blue) color space, and may be converted to the HSV (Hue, Saturation, Value) color space. However, the conversion of the color space is not necessary when the original color space is suitable for locating the textual object. For example, if the original color space is the HSV color space, embodiments of the present invention do not need to perform the conversion on the color space.

Next, the range determining module 580 may determine edge information 740 of the image 410 based on the color space 730, such that a target region of the image 410 in which the textual object is presented can be determined based on the edge information 740. Then, the range determining module 580 may determine the first color attribute value range 750 based on a color of the target region in the color space 730.

In some embodiments, the range determining module 580 may determine a statistical distribution of color attribute values associated with the target region and determine the first color attribute value range 750 based on the statistical distribution. The statistical distribution may indicate the relationship between the pixels of the image 410 and the color attribute values. For example, the statistical distribution may indicate the number of pixels accumulated at a respective color attribute value among the color attribute values.

Particularly, the range determining module 580 may identify two peaks in the statistical distribution such that a bottom of the statistical distribution is located between the two peaks and determine the first color attribute value range 750 based on color attribute values corresponding to the identified two peaks. The bottom is lower than a threshold. For example, the bottom may indicate the color attribute value at which the least number of pixels accumulated. In this case, the first color attribute value range 750 may reflect the main color attribute associated with the target region.

For example, as shown in FIG. 7, for the HSV color space 730, the HSV color space 730 is represented by three color attributes of hue, saturation, and value, which are referred to as H-component, S-component and V-component, respectively. Each component has a plurality of color attribute values, such as the color attribute values 0-255.

Range determining module 580 can determine the statistical distribution of color attribute values as well as the two peaks and bottom, in which the dashed lines indicate the peaks, and the circle indicates the bottom. In this case, range determining module 580 can determine the first color attribute value range 750. For example, range determining module 580 determine for the H-component, the first color attribute value to be the color attribute values 30-200. For the S-component, range determining module 580 determines the first color attribute value range to be the color attribute values 10-175. For the V-component, range determining module 580 determines the first color attribute value range to be the color attribute values 50-175. In this case, the first color attribute value range 750 associated with a textual object can be determined precisely and efficiently in consideration of the target region, rather than the whole image 410.

The recognition of a textual object(s) in an image has been described in the above. In some embodiments, the image 410 is included in a video containing a plurality of images. In this scenario, one or more textual objects in other images of the video may also be recognized by the modules in the image processing device 420.

In some example embodiments, the recognition of the textual object in a further image (referred to as "a second image") is based on the image 410 that has been recognized. In some embodiments, the second image may be adjacent to the first image. For example, the second image may be one frame after the first image in the video. The detailed functionalities of recognition result determining module 570 and range determining module 580 for recognizing the textual objects from a further image may be different.

Figure 8:
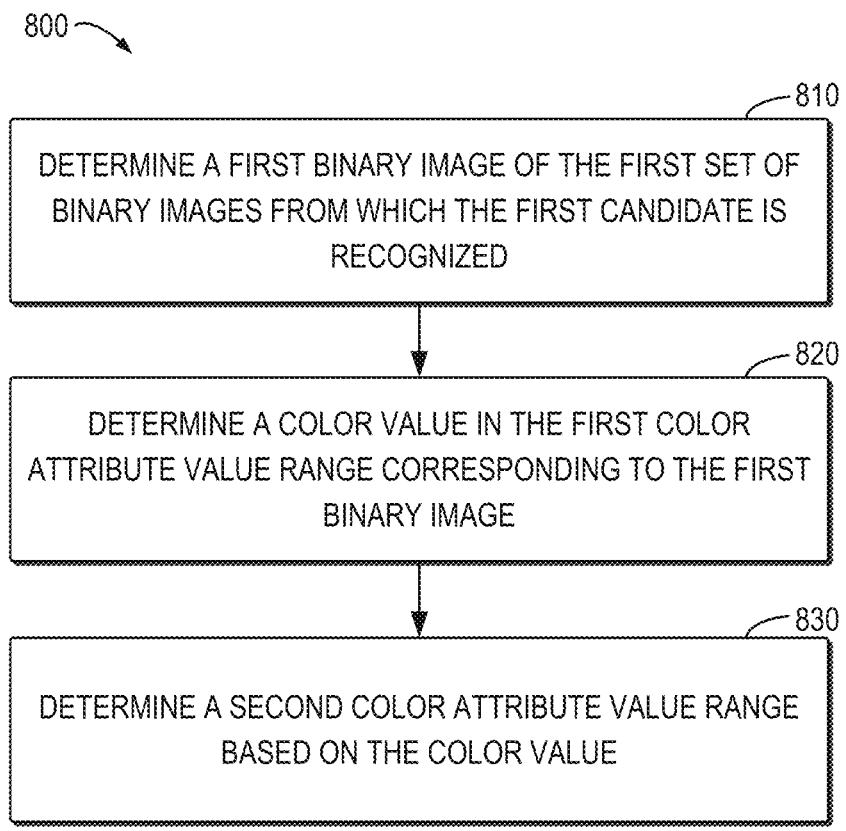
FIG. 8 depicts a flowchart of an example method for determining a color attribute value range, in accordance with an embodiment of the present invention.

Specifically, the range determining module 580 may determine a color attribute value range (referred to as "a second color attribute value range") within the first color attribute value range of the image 410 based on the first candidate for the image 410. FIG. 8 depicts a flowchart of an example method 800 for determining the second color attribute value range according to an embodiment of the present invention. In various embodiments, image processing device 420 performs processing steps and operations of example method 800, in accordance with embodiments of the present invention.

As shown in FIG. 8, at step 810, image processing device 420 (utilizing the range determining module 580) determines, from the first set of binary images generated from the image 410, a first binary image from which the first candidate is recognized. In step 820, image processing device 420 (utilizing the range determining module 580) determines a color attribute value in the first color attribute value range that is corresponding to the first binary image.

In some embodiments, image processing device 420 can determine the first binary image to be the binary image having the best recognition performance. For example, the textual object is "mutual." In this example, image processing device 420 determines the first binary image from which first candidate "mutual" is recognized (rather than the first binary image from which first candidate "manual" is recognized), such that the color attribute value at which the determined first binary image is sampled can be determined.

In addition, for a sequence of textual objects "mutual trust at stake," the first candidates of the first binary image sampled at the color attribute value of 50 of the H-component are "mutual trust at stake," the respective appearance frequency for each first candidate is 90%, 90%, 85% and 95%, and thus the accumulated appearance frequency is 360%.

As a comparison, the first candidates of the first binary image sampled at the color attribute value "100" of the H-component are "mutual trust as stake," the respective appearance frequency for each first candidate is 90%, 90%, 15% and 95%, and thus the accumulated appearance frequency is 280%. Clearly, the recognition performance of the first binary image sampled the color attribute value of 50 is better than the first binary image sampled at the color attribute value of 100. In this case, image processing device 420 determines the color attribute value of 50.

In step 830, image processing device 420 (utilizing the range determining module 580) determines a second color attribute value range based on the determined color attribute value. In various embodiments, the textual object presented in the video often changes gradually across successive images, that is to say, the textual object in two or more successive images may be substantially the same. In this case, the color attribute value range associated with the textual object of one image may be substantially the same as that of another image adjacent in time. Thus, to reduce the process complexity, the first color attribute value range of the image 410 may be reduced to obtain the second color attribute value range of the second image. In addition, to improve the efficiency, the first color attribute value range may be reduced around a color attribute value having the best recognition performance.

Figure 9:
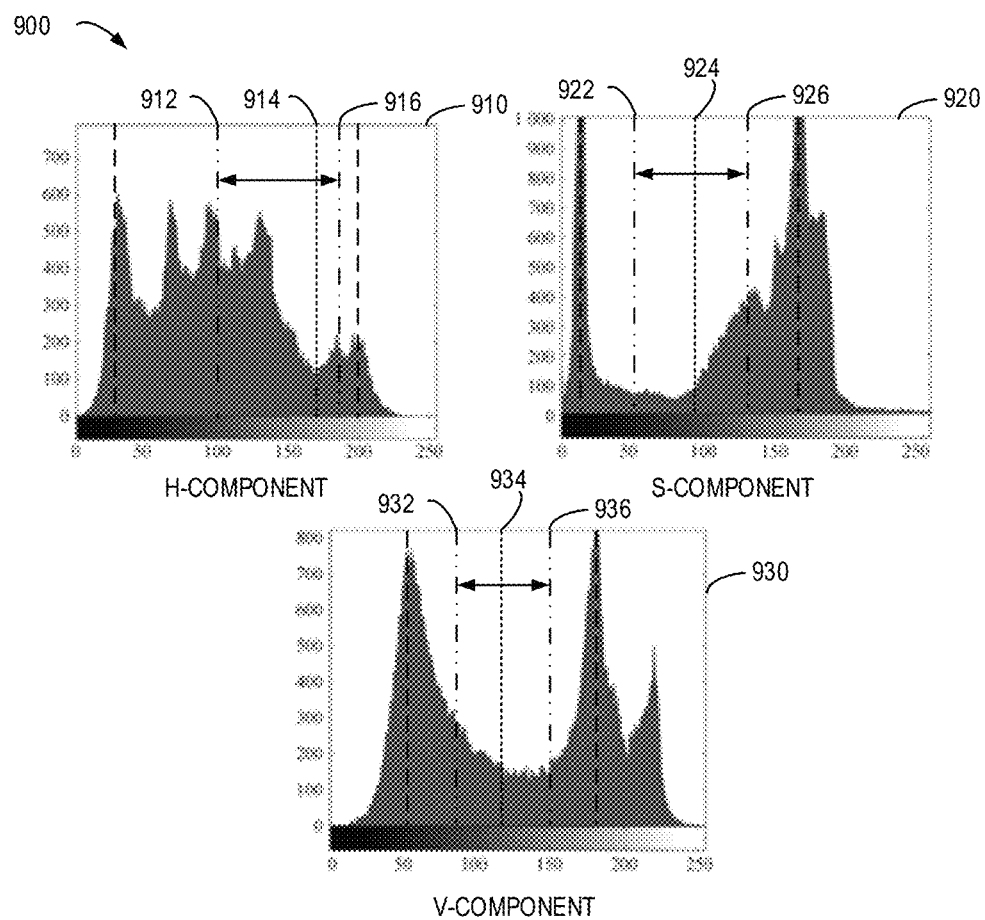
FIG. 9 depicts a schematic diagram of a color attribute value range reduction, in accordance with an embodiment of the present invention.

FIG. 9 depicts a schematic diagram 900 of a color attribute value range reduction according to an embodiment of the present invention. The best color attribute values of the H-component 910, S-component 920 and V-component 930 for the image 410 are indicated by the dotted lines 914, 924 and 934, respectively. The second color attribute ranges of the H-component, S-component and V-component for the second image are narrowing down from their respective first color attribute ranges around their respective best color attribute values. As shown, the reduced second color attribute ranges defined by the lines 912 and 916, 922 and 926, and 932 and 936 are narrowed, as compared with their respective first color attribute ranges.

The binary image generating module 540 may generate a set of binary images (referred to as "a second set of binary images") from the second image based on the second color attribute value range. The candidate recognition module 550 may obtain a set of candidates (referred to as "a second set of candidates") for the textual object in a second image of the plurality of images based on the second color attribute value range. The appearance frequency determining module 560 may determine an appearance frequency (referred to as "second appearance frequency") of a second candidate in the second set of candidates. These acts performed on the second image are similar to those performed on the image 410, and thus are omitted here.

For the determination of the recognition result (referred to as "second recognition result") for the textual object in the second image, the recognition result determining module 570 may determine the first recognition result as the second color attribute value range if the difference therebetween is small. Otherwise, re-recognition is to be performed on the second image.

In some cases, the determination of the second recognition result for the textual object in the second image is different from the image 410, because the textual object in the successive images of the video often continuously present. For example, a textual object shown in a previous image is often shown in a subsequent image. To improve the consistency of the recognition result, the determination of the second recognition result may be further determined based on the first recognition result determined from the image 410.

Figure 10:
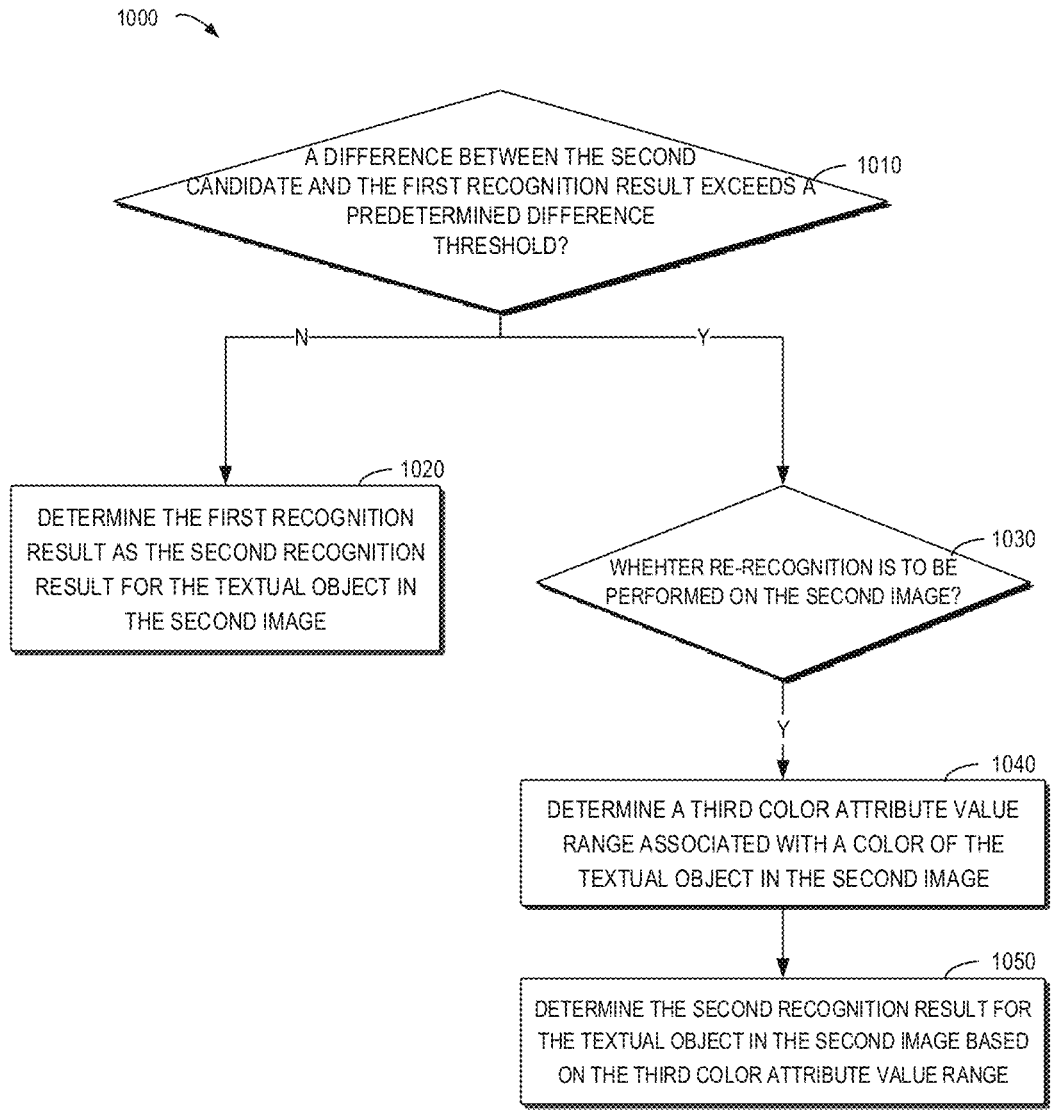
FIG. 10 depicts a flowchart of an example method for determining a recognition result, in accordance with an embodiment of the present invention.

FIG. 10 depicts a flowchart of an example method 1000 for determining the second recognition result according to an embodiment of the present invention. In various embodiments, image processing device 420 performs processing steps and operations of example method 1000, in accordance with embodiments of the present invention.

In decision step 1010, image processing device 420 (utilizing the recognition result determining module 570) compares the second candidate with the first recognition result. If image processing device 420 determines that the difference between the second candidate and the first recognition result is below a difference threshold (decision step, 1010, NO branch), then image processing device 420 (utilizing the recognition result determining module 570) determines the first recognition result as the second recognition result for the textual object in the second image (step 1020).

For example, the first recognition result may be "mutual trust as stake," and the second candidate may be "mutual trust at stake." Due to only a minor difference between the first recognition result and the second candidate, the second candidate may be set to be "mutual trust as stake."

If image processing device 420 determines that the difference between the second candidate and the first recognition result exceeds a difference threshold (decision step, 1010, YES branch), then image processing device 420 (utilizing the recognition result determining module 570) determines, based on the second appearance frequency, whether re-recognition is to be performed on the second image (decision step 1030). In an example embodiment, image processing device 420 determines that the second candidate is obtained based on a smaller color attribute value range and may be error prone. A large difference may indicate that the second recognition result is erroneous. In addition, to further verify that the second candidate is erroneous, the second appearance frequency of the second candidate is taken into account. For example, if the appearance frequency is low, then the recognition result may be questionable. Similarly, for a sequence of second candidates, if the average appearance frequency for the second candidates is low, then the sequence of second candidates may be questionable.

In response to determining that re-recognition is to be performed on the second image (decision step 1030, YES branch), image processing device 420 (utilizing the recognition result determining module 570) determines a third color attribute value range associated with a color of the textual object in the second image (step 1040). The determination of the third color attribute value range is similar to the determination of the first color attribute value range, and thus is omitted here (described in further detail above). In example embodiments, since third color attribute value range is determined from the second image per se, the third color attribute value range is accurate, and will not lead to the potential incorrect recognition of the textual object in the second image.

In step 1050, image processing device 420 (utilizing the recognition result determining module 570) determines the second recognition result for the textual object in the second image based on the third color attribute value range. If the re-recognition will not be performed on the second image, turning to 1020, then the recognition result determining module 570 determines the first recognition result as the second recognition result for the textual object in the second image.

In addition, determining the first recognition result as the second recognition result may cause successive errors. For example, for the textual object "mutual trust at stake," it is assumed that the first recognition result in the image 410 is "mutual trust as stake," and the second candidate in the second image is "mutual trust at stake." Since the difference between the first recognition result and the second candidate is small, image processing device 420 can determine that the second recognition result in the second image is the incorrect first recognition result "mutual trust as stake," rather than the correct second candidate "mutual trust at stake."

To deal with such errors, the appearance frequencies of the candidates for the textual object throughout the images in the video can be used to correct the recognition result. For example, throughout the video, the total appearance frequency of the candidate "at" is 8, and the total appearance frequency of the candidate "as" is 2. In this example, the recognition results for the textual object "at" in all the images in the video should be corrected to be "at." Accordingly, the binarization of the image and the determination of the recognition result for the textual object can be improved. As such, the text recognition for the images or video can be accurate, time-efficient and cost saving.

Figure 11:
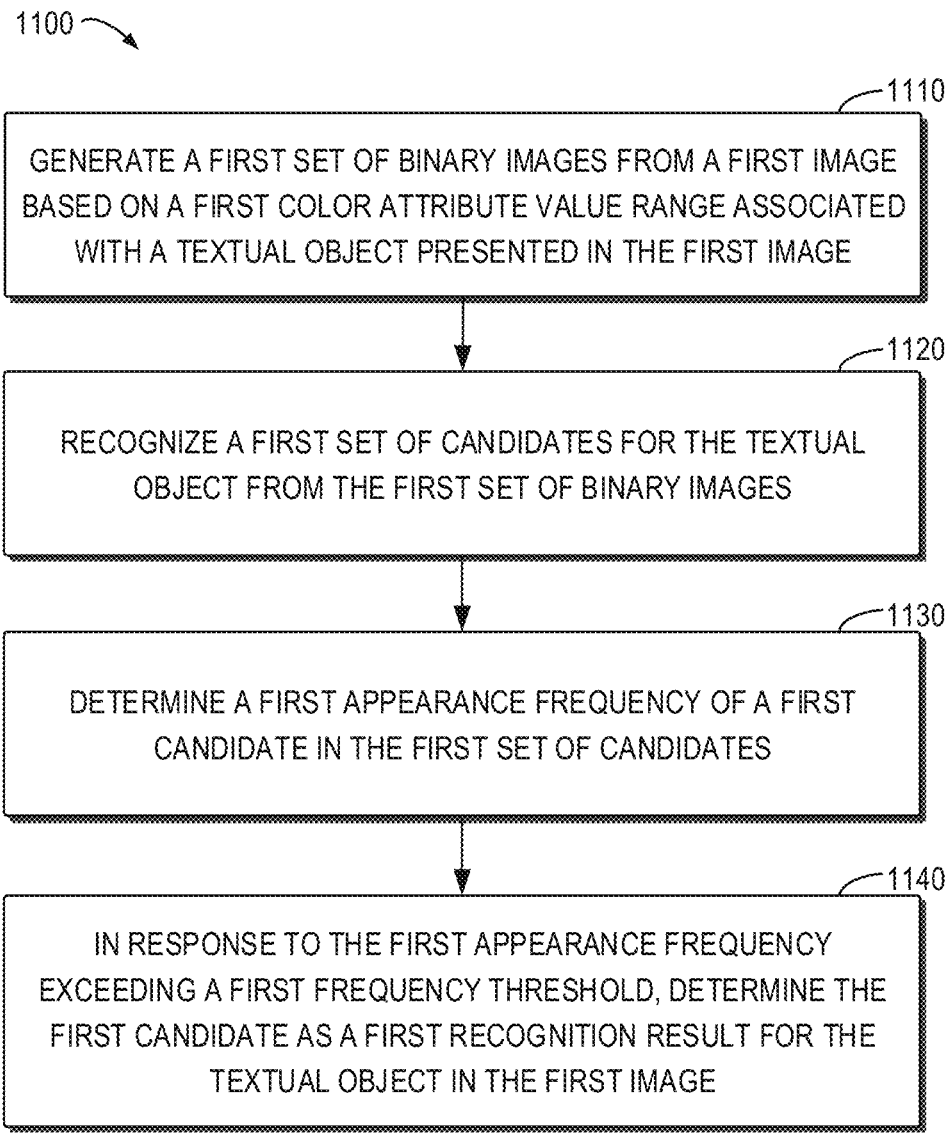
FIG. 11 depicts a flowchart of an example method for image processing, in accordance with an embodiment of the present invention.

FIG. 11 depicts a flowchart of an example method 1100 for image processing according to an embodiment of the present invention. The method 1100 may be implemented by the image processing device 420, or other suitable computer/computing systems, in accordance with various embodiments of the present invention.

In step 1110, the image processing device 420 generates a first set of binary images from a first image based on a first color attribute value range associated with a textual object presented in the first image. In step 1120, the image processing device 420 recognizes a first set of candidates for the textual object from the first set of binary images. In step 1130 the image processing device 420 determines a first appearance frequency of a first candidate in the first set of candidates. In step 1140, the image processing device 420 determines the first candidate as a first recognition result for the textual object in the first image in response to the first appearance frequency exceeding a first frequency threshold.

In some embodiments, the image processing device 420 may further determine edge information of the first image based on a color space associated with the first image; determine a target region of the first image in which the textual object is presented based on the edge information; and determine the first color attribute value range based on a color of the target region in the color space.

In some embodiments, the image processing device 420 may determine a statistical distribution of color attribute values associate with the target region; and determine the first color attribute value range based on the statistical distribution.

In some embodiments, the image processing device 420 may identify two peaks in the statistical distribution, such that a bottom of the statistical distribution is located between the two peaks, the bottom being lower than a threshold; and determine the first color attribute value range based on color attribute values corresponding to the identified two peaks.

In some embodiments, the image processing device 420 may select a set of color attribute values from the first color attribute value range; and generate the first set of binary images by binarizing the first image based on the set of color attribute values.

In some embodiments, the first image is included in a video containing a plurality of images, and the image processing device 420 may further determine a second color attribute value range within the first color attribute value range based on the first candidate; obtain a second set of candidates for the textual object in a second image of the plurality of images based on the second color attribute value range; determine a second appearance frequency of a second candidate in the second set of candidates; and in response to the second appearance frequency exceeding a second frequency threshold, determine a second recognition result for the textual object in the second image based on the second candidate.

In some embodiments, the image processing device 420 may determine a first binary image of the first set of binary images from which the first candidate is recognized; determine a color attribute value in the first color attribute value range corresponding to the first binary image; and determine a second color attribute value range based on the determined color attribute value.

In some embodiments, the image processing device 420 may compare the second candidate with the first recognition result; and in response to a difference between the second candidate and the first recognition result being below a difference threshold, determine the first recognition result as the second recognition result for the textual object in the second image.

In some embodiments, the image processing device 420 may, in response to the difference exceeding the difference threshold, determine whether re-recognition is to be performed on the second image based on the second appearance frequency; in response to the re-recognition being to be performed, determine a third color attribute value range associated with a color of the textual object in the second image; and determine the second recognition result for the textual object in the second image based on the third color attribute value range.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by one or more processors, a first set of binary images from a first image based on a first color attribute value range associated with a textual object presented in the first image;
   recognizing, by the one or more processors, a first set of candidates for the textual object from the first set of binary images;
   determining, by the one or more processors, a first appearance frequency of a first candidate in the first set of candidates;
   in response to determining that the first appearance frequency exceeds a first frequency threshold, determining, by the one or more processors, that the first candidate is a first recognition result for the textual object in the first image, wherein the first image is included in a video containing a plurality of images;
   determining, by the one or more processors, a second color attribute value range within the first color attribute value range based on the first candidate;

obtaining, by the one or more processors, a second set of candidates for the textual object in a second image of the plurality of images based on the second color attribute value range;

determining, by the one or more processors, a second appearance frequency of a second candidate in the second set of candidates; and in response to determining that the second appearance frequency exceeds a second frequency threshold, determining, by the one or more processors, a second recognition result for the textual object in the second image based on the second candidate.

2. The method of claim 1, further comprising:

determining, by the one or more processors, edge information of the first image based on a color space associated with the first image;

determining, by the one or more processors, a target region of the first image in which the textual object is presented based on the edge information; and determining, by the one or more processors, the first color attribute value range based on a color of the target region in the color space.

3. The method of claim 2, wherein determining the first color attribute value range comprises:

determining, by the one or more processors, a statistical distribution of color attribute values associate with the target region; and determining, by the one or more processors, the first color attribute value range based on the statistical distribution.

4. The method of claim 3, wherein determining the first color attribute value range based on the statistical distribution comprises:

identifying, by the one or more processors, two peaks in the statistical distribution such that a bottom of the statistical distribution is located between the two peaks, the bottom being lower than a threshold; and determining, by the one or more processors, the first color attribute value range based on color attribute values corresponding to the identified two peaks.

5. The method of claim 1, wherein generating the first set of binary images comprises:

selecting, by the one or more processors, a set of color attribute values from the first color attribute value range; and generating, by the one or more processors, the first set of binary images by binarizing the first image based on the set of color attribute values.

6. The method of claim 1, wherein determining the second color attribute value range comprises:

determining, by the one or more processors, a first binary image of the first set of binary images from which the first candidate is recognized;

determining, by the one or more processors, a color attribute value in the first color attribute value range corresponding to the first binary image; and determining, by the one or more processors, a second color attribute value range based on the determined color attribute value.

7. The method of claim 1, wherein determining the second recognition result comprises:

comparing, by the one or more processors, the second candidate with the first recognition result; and in response to a difference between the second candidate and the first recognition result being below a difference threshold, determining, by the one or more processors, the first recognition result as the second recognition result for the textual object in the second image.

8. The method of claim 7, wherein determining the second recognition result further comprises:

in response to determining that the difference exceeds the difference threshold, determining, by the one or more processors, whether re-recognition is to be performed on the second image based on the second appearance frequency;

in response to determining to perform the re-recognition, determining, by the one or more processors, a third color attribute value range associated with a color of the textual object in the second image; and determining, by the one or more processors, the second recognition result for the textual object in the second image based on the third color attribute value range.

9. A computer program product comprising:

one or more computer readable storage media and program instructions stored on the one or more computer readable storage media, the program instructions comprising:

program instructions to generate a first set of binary images from a first image based on a first color attribute value range associated with a textual object presented in the first image;

program instructions to recognize a first set of candidates for the textual object from the first set of binary images;

program instructions to determine a first appearance frequency of a first candidate in the first set of candidates;

in response to determining that the first appearance frequency exceeds a first frequency threshold, program instructions to determine that the first candidate is a first recognition result for the textual object in the first image, wherein the first image is included in a video containing a plurality of images;

determine a second color attribute value range within the first color attribute value range based on the first candidate;

obtain a second set of candidates for the textual object in a second image of the plurality of images based on the second color attribute value range;

determine a second appearance frequency of a second candidate in the second set of candidates; and in response to determining that the second appearance frequency exceeds a second frequency threshold, determine a second recognition result for the textual object in the second image based on the second candidate.

10. The computer program product of claim 9, further comprising program instructions, stored on the one or more computer readable storage media, to:

determine edge information of the first image based on a color space associated with the first image;

determine a target region of the first image in which the textual object is presented based on the edge information; and determine the first color attribute value range based on a color of the target region in the color space.

11. The computer program product of claim 10, wherein the program instructions to determine the first color attribute value range further comprise program instructions to:

determine a statistical distribution of color attribute values associate with the target region; and determine the first color attribute value range based on the statistical distribution.

12. The computer program product of claim 11, wherein the program instructions to determine the first color attribute value range further comprise program instructions to:

identify two peaks in the statistical distribution such that a bottom of the statistical distribution is located between the two peaks, the bottom being lower than a threshold; and determine the first color attribute value range based on color attribute values corresponding to the identified two peaks.

13. The computer program product of claim 9, wherein the program instructions to determine the first color attribute value range further comprise program instructions to:

select a set of color attribute values from the first color attribute value range; and generate the first set of binary images by binarizing the first image based on the set of color attribute values.

14. A computer system comprising:

one or more computer processors;

one or more computer readable storage media; and program instructions stored on the computer readable storage media for execution by at least one of the one or more processors, the program instructions comprising:

program instructions to generate a first set of binary images from a first image based on a first color attribute value range associated with a textual object presented in the first image;

program instructions to recognize a first set of candidates for the textual object from the first set of binary images;

program instructions to determine a first appearance frequency of a first candidate in the first set of candidates;

in response to determining that the first appearance frequency exceeds a first frequency threshold, program instructions to determine that the first candidate is a first recognition result for the textual object in the first image, wherein the first image is included in a video containing a plurality of images;

determine a second color attribute value range within the first color attribute value range based on the first candidate;

obtain a second set of candidates for the textual object in a second image of the plurality of images based on the second color attribute value range;

determine a second appearance frequency of a second candidate in the second set of candidates; and in response to determining that the second appearance frequency exceeds a second frequency threshold, determine a second recognition result for the textual object in the second image based on the second candidate.

15. The computer system of claim 14, further comprising program instructions, stored on the computer readable storage media for execution by at least one of the one or more processors, to:

determine edge information of the first image based on a color space associated with the first image;

determine a target region of the first image in which the textual object is presented based on the edge information; and determine the first color attribute value range based on a color of the target region in the color space.

16. The computer system of claim 15, wherein the program instructions to determine the first color attribute value range further comprise program instructions to:

determine a statistical distribution of color attribute values associate with the target region; and determine the first color attribute value range based on the statistical distribution.

17. The computer system of claim 16, wherein the program instructions to determine the first color attribute value range further comprise program instructions to:

identify two peaks in the statistical distribution such that a bottom of the statistical distribution is located between the two peaks, the bottom being lower than a threshold; and determine the first color attribute value range based on color attribute values corresponding to the identified two peaks.

18. The computer system of claim 14, further comprising program instructions, stored on the computer readable storage media for execution by at least one of the one or more processors, to:

select a set of color attribute values from the first color attribute value range; and generate the first set of binary images by binarizing the first image based on the set of color attribute values.

* * * * *